United States Patent [19]

Lambert et al.

[11] 4,456,534

[45] Jun. 26, 1984

[54] WATER CLARIFICATION

[75] Inventors: Jean-Pierre Lambert, Strasbourg; Michel L'Huillier, Mundolsheim, both of France

[73] Assignee: Polysar International S.A., Switzerland

[21] Appl. No.: 400,104

[22] Filed: Jul. 20, 1982

[30] Foreign Application Priority Data

Aug. 27, 1981 [FR] France ................................. 81 16371

[51] Int. Cl.³ ............................................... C02F 1/54
[52] U.S. Cl. .................................... 210/725; 210/727; 210/908
[58] Field of Search ....................... 210/708, 908–910, 210/723–728, 738

[56] References Cited

U.S. PATENT DOCUMENTS

| 4,096,061 | 6/1978 | Brennan | 210/725 |
| 4,108,768 | 8/1978 | Sebelik et al. | 210/725 |

FOREIGN PATENT DOCUMENTS

| 2021826 | 11/1971 | Fed. Rep. of Germany | 210/726 |
| 49-32268 | 8/1974 | Japan | 210/705 |
| 50-33350 | 10/1975 | Japan | 210/727 |
| 51-16755 | 2/1976 | Japan | 210/727 |
| 1535497 | 12/1978 | United Kingdom | 210/736 |

OTHER PUBLICATIONS

Kerr, J. E. et al., "Company Solves Water Problem", Proc. of the 36th Ind. Water Conf., May 12–14, (1981), pp. 36–40.

Report No. C.D. 2250, Mar. 1977, David H. Buisson from the Department of Scientific and Industrial Research New Zealand, "Treatment of Rubber Latex Wastes".

*Primary Examiner*—Benoît Castel
*Attorney, Agent, or Firm*—Stevens, Davis, Miller & Mosher

[57] ABSTRACT

This invention is directed to an improved process for clarifying a waste water stream containing waste synthetic polymeric material in latex form. The process comprises treating the waste water stream in sequence with calcium chloride and a cationic flocculant, calcium, potassium or sodium hydroxide, and an anionic flocculant. The aggregated polymeric material which results is then separated from the waste water and an essentially clear waste water stream is thereby provided.

11 Claims, No Drawings

WATER CLARIFICATION

This invention is directed to a process for clarifying waste water which contains waste synthetic polymeric material in latex form.

The use of polymeric flocculants in the clarification of waste water which contains suspended colloidal solids is well known in the art. Polymeric flocculants of both natural and synthetic origin are known. In recent years synthetic flocculants have been gaining favour mainly because they can be used at much lower dose rates than can the natural materials. The synthetic polymeric flocculants are often referred to as polyelectrolytes and are soluble in aqueous media. They are generally classified according to their functional groups as nonionic, anionic, and cationic. Most nonionic polyelectrolytes are acrylamide homopolymers while most anionic polyelectrolytes partially hydrolyzed acrylamide homopolymers or are copolymers of acrylamide and acrylic acid. There are several types of cationic polyelectrolytes and most contain quanternized nitrogen atoms. These include poly(ethyleneimine)s, poly(alkylenepolyamine)s which are also referred to as quaternized condensation polyamines, poly(dimethyldiallylammonium chloride), and copolymers of acrylamide with monomers containing quaternized nitrogen atoms. Polymeric flocculants in general cause the suspended colloidal particles in waste water to aggregate thereby facilitating their separation from the water. In many cases, it has been found to be advantageous to first add an inorganic salt such as alum or calcium chloride as a primary coagulant in order to sensitize the suspended particles to flocculation.

Industrial plants which manufacture or use synthetic or natural rubbers, latexes, or resinous polymers often produce aqueous waste streams containing suspended colloidal polymeric particles. These streams must be clarified in order to meet water pollution control regulations and it is known to use polymeric flocculants in the clarification process. Japanese Patent Application No. 74/32,268 teaches a process for clarification of a turbid waste water containing a small amount of a colloidal polymer which derives from a rubber latex, a synthetic rubber or resin, or a resinous emulsion. A primary coagulant, polyaluminum chloride, is added to the turbid waste water followed by powdered polyacrylamide as a flocculant. This mixture is blended and agitated and the resulting aggregated solid is separated from the waste water. British Pat. No. 1,535,497 teaches the use of a cationic polymeric compound containing one or more polyoxyethylene groups as a flocculant for effluents from a natural rubber latex concentration plant. Report C.D. 2250 dated 1977 from the Chemitry Division of the New Zealand Department of Scientific and Industrial Research teaches that latex is recovered from carpet and rubber manufacturing effluents by pretreating the effluents with alum, lime, calcium chloride or calcuim nitrate and then flocculating with a medium anionic polyelectrolyte. The latex sludge which results is recovered thereby providing a nearly clear effluent.

It has been found that the clarification of waste water containing one or more caboxylated synthetic polymers, especially carboxylated styrene-butadiene copolymers, alone or in combination with non-carboxylated sythetic polymers, in latex form is difficult. It is believed that the ionic nature of the copolymerized carboxylic groups tends to prevent effective aggregation of the latex particles in the waste water and thereby prevents effective separation of the aggregate from the waste water.

It is an object of the present invention to provide an improved process for clarifying waste water which contains one or more synthetic carboxylated styrene-butadiene copolymers in latex form alone or in admixture with one or more other synthetic polymers in latex form.

A plant which manufactures or uses synthetic carboxylated styrene-butadiene copolymers often manufactures or uses other synthetic polymeric materials such as styrene-butadiene copolymers, acrylonitrile-butadiene copolymers, or carboxylated acrylonitrile-butadiene copolymers. Such a plant may at any given time produce waste water containing one or more of these other synthetic polymeric materials in latex form in addition to or instead of carboxylated styrene-butadiene copolymers in latex form. The exact composition of the polymeric materials in the waste water of such plants may therefore vary with time depending on the combination of waste-generating activities in the plant. It is desirable to have a clarification process which does not require changes to be made to it as the composition of the polymeric materials in the waste water changes.

It is therefore a further object of the present invention to provide a process for clarification of waste water which contains one or more of any of the aforesaid sythetic polymeric materials in latex form.

It is a still further object of the present invention to provide a process which is adaptable to existing waste treatment facilities in such plants without the need for and cost of sophisticated control equipment and procedures and which provides a cohesive aggregate from the polymeric particles dispersed in the waste water such that the aggregate may be easily and effectively separated from the waste water using conventional means such as flotation or screening, thereby to produce waste water which is essentially clear.

Accordingly, the present invention provides an improved process for clarifying a waste water stream containing therein up to about 1.5 percent by weight of waste synthetic polymeric material in latex form by the use of polymeric flocculants, the improvement in which comprises (i) feeding said waste water stream to a container equipped with means for agitation, (ii) maintaining said waste water in said container in an agitated condition for a time of from at least about 3 minutes up to about 3 hours while adding to said container an aqueous stream of calcium chloride sufficient to provide a concentration of from about 200 to about 3000 ppm based on the total water in said container and a liquid or aqueous stream of a cationic flocculant selected from the class consisting of quaternary nitrogen atom containing poly(alkylenepolyamine) and poly(ethylenimine) flocculants identified as Betz Polymer 1190, Betz Polymer 1290 and Sedipur CL 930 sufficient to provide a concentration of said cationic flocculant of from about 10 to about 50 ppm based on the total water in said container, (iii) adding to said waste water sufficient of an aqueous stream of calcium, potassium or sodium hydroxide to adjust the pH to from about 9 to about 10, (iv) adding to said waste water an aqueous stream of an anionic polymeric flocculant generally characterized as a high molecular weight acrylamide-acrylic acid resin of medium anionic functionality sufficient to provide a concentration of said anionic flocculant of from about 2 to about 10 ppm in said waste water, and (v) passing said waste water stream to separation means to separate therefrom the resulting aggregated polymeric material and to provide an essentially clear waste water stream.

There are three preferred embodiments of the combination of steps (iii) and (iv) in the process of the present invention. Both of these steps may be performed in the container referred to in step (ii). In this preferred embodiment, step (iii) additionally comprises adding said hydroxide to said waste water in said container, and step (iv) additionally comprises maintaining said waste water in said container in an agitated condition for a time of from about 1 to about 15 minutes while adding said anionic flocculant to said waste water. In a second preferred embodiment, step (iii) additionally comprises passing said waste water stream from said container to a second container equipped with means for agitation while adding said hydroxide to said waste water stream, and step (iv) additionally comprises maintaining said waste water in said second container in an agitated condition for a time of from about 1 to about 15 minutes while adding said anionic flocculant to said waste water. In a third preferred embodiment, step (iii) additionally comprises passing said waste water stream from said container to a pipe or trench while adding said hydroxide to said waste water stream, and step (iv) additionally comprises adding said anionic flocculant to said waste water stream in said pipe or trench.

The waste water which may be clarified by the process of the present invention may contain up to about 1.5 percent by weight of waste synthetic polymeric material in latex form and may also contain soaps and other water soluble materials used in the manufacture of the latex. The waste synthetic polymeric material comprises polymers selected from the group consisting of carboxylated styrene-butadiene copolymers, styrene-butadiene copolymers, acrylonitrile-butadiene copolymers, carboxylated acrylonitrile-butadiene copolymers, and mixtures thereof. The process of the present invention has been found to be especially effective in clarifying waste water which contains one or more carboxylated styrene-butadiene copolymers in latex form alone or in admixture with one or more of the other hereinabove mentioned polymers in latex form, in contrast to processes heretofore known. The preferred concentration of the polymeric material in the waste water is from about 0.1 to about 0.5 percent by weight.

In step (i) of the process of the present invention the waste water stream is fed into a container equipped with means for agitation. The container may be of any convenient open or closed type of sufficient capacity to handle the volume of waste water required over a given period of time. It is preferred that the container be equipped with an outlet and pumping means to control the rate of flow of the waste water into and out of the container.

In step (ii) of the present process, the waste water in the container is agitated and an aqueous stream of calcium chloride is added to the container as a primary coagulant along with a stream of cationic polymeric flocculant. The waste water is maintained in an agitated condition in the container for a time of from at least about 3 minutes up to about 3 hours, preferably from about 5 to about 30 minutes, to ensure through mixing. The stream of calcium chloride may contain from about 2 to about 25 percent by weight calcium chloride and an amount is added sufficient to provide a concentration of from about 200 to about 3000 ppm off calcium chloride based on the total water in the container. When the waste water contains the preferred range of polymeric material of from about 0.1 to about 0.5 percent by weight, the concentration of calcium chloride which is desirable is from about 200 to about 500 ppm. When the waste water contains about 1.5 percent by weight of the polymeric material, acceptable results are obtained with a concentration of calcium chloride up to about 3000 ppm, but for best results the desired concentration of calcium chloride is about 1000 ppm.

The cationic polymeric flocculant is generally available in the form of a liquid and may be added to the container as a pure liquid stream or as an aqueous stream containing at least about 0.1 percent by weight of the flocculant. The flocculant stream and the calcium chloride stream may be added to the container as separate streams or they may be mixed together and added as a single stream. Sufficient of the cationic flocculant is added to provide a concentration of from about 10 to about 50, preferably from about 15 to about 25 ppm of the flocculant based on the total water in the container. A large variety of cationic polymeric flocculants are known in the art but due to the proprietary nature of most of these, their exact chemical structure is often not disclosed. In the process of the present invention, only a relative few of these flocculants are known to produce desirable results at ambient temperature while others require undesirable elevated temperatures or do not work at all. Three cationic flocculants are known to produce desirable results at ambient temperature and all may be characterized as cationic quaternary nitrogen atom containing flocculants. Two of these are sold as clear liquids by Betz Laboratories Limited under the tradenames of Betz Polymer 1190 and Betz Polymer 1290. These are believed to be strongly catonic poly-(alkylene-polyamine)s formed by the condensation of epichlorohydrin and alkyl amines. The third flocculant is sold as a 30 percent by weight aqueous solution under the tradename of Sedipur CL 930 by BASF AG. This material is described as a high molecular weight cationic poly(ethyleneimine).

In the combination of steps (iii) and (iv) of the present process an aqueous stream of hydroxide is added to the waste water followed by an aqueous stream of anionic flocculant. The combination of these steps may be performed in any convenient manner. It has been found that any of the three preferred embodiments described hereinabove for the combination of steps (iii) and (iv) produces desirable results.

In the first of these embodiments, the aqueous stream of hydroxide is added to the waste water in the container used in step (ii). The waste water is then maintained in an agitated condition in the container for a time of from about 1 to about 15 minutes while the aqueous stream of anionic flocculant is added thereto. The waste water stream is then passed through the outlet of the container in preparation for step (v).

In the second preferred embodiment of the combination of steps (iii) and (iv), the waste water stream is passed throuugh the outlet of the container into a second containerr which may be similar to the type described hereinabove for the container used in step (ii) and which is equipped with means for agitation. As the waste water stream is passed through the outlet towards the second container the aqueous stream of hydroxide is added to the waste water stream preferably just downstream of the outlet. The waste water is then maintained in an agitated condition in the second container for a time of from about 1 to about 15 minutes while the aqueous stream of anionic flocculant is added thereto. The waste water stream is then passed through the outlet of the second container in preparation for step (v).

In the third preferred embodiment of steps (iii) and (iv), the waste water stream is passed through the outlet of the container into a pipe or trench. As the waste water stream is passed through the outlet towards the pipe or trench, the aqueous stream of hydroxide is added to the waste water stream, preferably just downstream of the outlet. The aqueous stream of anionic flocculant is then added to the waste water stream in the pipe or trench. The flow of the waste water stream in the pipe or trench should be such as to provide adequate mixing of the waste water and the anionic flocculant streams in the pipe or trench before the waste water is passed from the pipe or trench in preparation for step (v).

In step (iii) of the present process, the aqueous stream of calcium, potassium or sodium hydroxide which is added contains from about 2 to about 47, preferably from about 35 to about 45, percent by weight of hydroxide. Sufficient is added to the waste water to adjust the pH thereof to from about 9 to about 10.

Similarly, the aqueous stream of anionic flocculant added in step (iv) contains from about 0.1 to about 0.5 percent by weight of the flocculant. Sufficient is added to the waste water to provide from about 2 to about 10, preferably from about 3 to about 5, ppm of the anionic flocculant in the waste water. A wide variety of anionic flocculants are known in the art and many of these may be used in the process of the present invention. It has been found that best results are produced when the anionic polymeric flocculant which is used is a high molecular weight acrylamide-acrylic acid resin of medium anionic functionality. Desirable results may be obtained using materials of this type sold under the tradenames of Hercofloc 831 or Hercofloc 735 by Hercules Incorporated or Betz Polymer 1220 by Betz Laboratories Limited.

After step (iv) has been completed the polymeric material in the waste water will be present in the form of a cohesive aggregate. In step (v) of the present process, the waste water stream resulting from step (iv) is passed to separation means to separate the aggregated polymeric material from the waste water and to provide thereby an essentially clear waste water stream. The separation means may be, for example, flotation means or screening means which are well known in the art.

The process of the present invention provides a cohesive aggregate of the waste synthetic polymeric material originally present in the waste water stream in the form of a latex. The aggregate is easily and effectively separated from the waste water using conventional separation means thereby providig waste water which is essentially clear. The process is easily adapted to existing waste treatment facilities in plants which manufacture or use these synthetic polymeric materials and the process does not require sophisticated control equipment and procedures.

The following examples are intended to illustrate the process of the present invention and do not limit the scope thereof.

EXAMPLE 1

To a container equipped with an agitator was added 1 liter of a blend of aqueous effluents generated during the manufacture of three different carboxylated styrene-butadiene copolymer latexes. In this example, an ambient temperature of about 22° C. was maintained throughout. The blend contained a total of 0.3 percent by weight of the copolymers. The blend also contained a mixture of both anionic and non-ionic soaps used in the manufacture of the latexes in a concentration of 0.15 percent by weight. 1.5 ml of a 20 percent by weight aqueous solution of calcium chloride and 2 ml of a 1 percent by weight aqueous solution of Betz Polymer 1190 were simultaneously added to the container and the resulting mixture was agitated for 5 minutes. To the container was added a sufficient amount of a 40 percent by weight aqueous solution of sodium hydroxide to adjust the pH of the contents to 9.5 and the resulting mixture was agitated for 0.5 minute. This was followed by the addition of 4 ml of a 0.1 percent by weight aqueous solution of Hercofloc 831. The resulting mixture was agitated for 5 minutes. The agitation was stopped and a very cohesive aggregate of the copolymers was observed to have been formed. The contents of the container were then poured through a fine screen into a second container. It was observed that the effluent in the second container was essentially clear with essentially all of the copolymer material having been collected on the screen.

EXAMPLE 2

This example illustrates the use of the process of the present invention in the continuous effluent treatment facilities of a synthetic rubber latex manufacturing plant. The waste water stream from the plant which required clarificaton contained a mixture of effluents generated during the manufacture of the latex forms of styrene-butadiene copolymers, carboxylated styrene-butadiene copolymers, acrylonitrile-butadiene copolymers, and carboxylated acrylonitrile-butadiene copolymers. The composition of the stream varied with time with regard to both the relative amounts of each of the copolymers present and the total amount of the various copolymers in the stream, the latter varying between about 0.2 and about 0.5 percent by weight of the copolymers. Soaps and other water soluble materials used in the manufacture of the latexes were also present in the waste water. The entire process was run at ambient temperature which varied from about 18° to about 25° C. through the duration of the experiment. The waste water stream was continuously fed through an inlet of a first tank, allowed to flow through the tank while being continuously agitated, and then allowed to flow from the outlet of the tank. The flow rates of the waste water into and out of the tank were controlled so that the total water content of the tank remained essentially constant throughout and so that the average residence time of the waste water in the tank was from about 5 to about 7 minutes. An aqueous stream containing 20 percent by weight of calcium chloride was added to the first tank on a continuous basis at a rate such that the concentration of the calcium chloride was maintained at from about 200 to about 500 ppm based on the total water contained in the tank. Also added on a continuous basis was an aqueous stream containing 1 percent by weight of the cationic flocculant Sedipur CL 930 at a rate sufficient to maintain a concentration of the flocculant of from about 15 to about 25 ppm based on the total water contained in the tank. As the waste water stream flowed from the outlet of the first tank, an aqueous stream containing 40 percent by weight of calcium hydroxide was added to the waste water just downstream of the outlet at a rate sufficient to adjust the pH of the waste water stream to from about 9 to about 10. The waste water stream was then allowed to flow into a second tank where it was continuously agitated as it flowed through the tank to the outlet. The inlet and outlet flow rates were controlled to maintain an essentially constant volume of waste water in this tank and so that the average residence time of the waste water was from about 5 to about 7 minutes. An aqueous stream containing 0.4 percent by weight of the anionic flocculant Betz Polymer 1220 was continuously added to the second tank at a rate sufficient to maintain a concentration of the anionic flocculant of from about 3 to about 5 ppm based on the total water contained in the tank. After exiting the second tank, the waste water stream was allowed to flow to conventional screening means where the cohesive aggregate of the mixture of copolymers was essentially completely separated from the waste water, thereby providing an essentially clear waste water stream.

The embodiments of the invention in which an exclusive property or privilege is claimed are defined as follows:

1. An improved process for clarifying a waste water stream containing therein up to about 1.5 percent by weight of waste synthetic polymeric material in latex form by the use of polymeric flocculants, characterized in that the improvement comprises; the following sequential steps:
    (i) feeding said waste water stream to a container equipped with means for agitation,
    (ii) maintaining said waste water in said container in an agitated condition for a time of from at least about 3 minutes up to about 3 hours while adding to said container an aqueous stream of calcium chloride sufficient to provide a concentration of from about 200 to about 3000 ppm based on the total water in said container and a liquid or aqueous stream of a cationic flocculant selected from the class consisting of quaternary nitrogen atom containing poly(alkylenepolyamine) and poly(ethyleneimine) flocculants sufficient to provide a concentration of said cationic flocculant of from about 10 to about 50 ppm based on the total water in said container,
    (iii) adding to said waste water sufficient of an aqueous stream of calcium, potassium or sodium hydroxide to adjust the pH to from about 9 to about 10,
    (iv) adding to said waste water an aqueous stream of an anionic polymeric flocculant generally characterized as a high molecular weight acrylamide-acrylic acid resin of medium anionic functionality sufficient to provide a concentration of said anionic flocculant of from about 2 to about 10 ppm in said waste water, and
    (v) passing said waste water stream to separation means to separate therefrom the resulting aggregated polymeric material and to provide an essentially clear waste water stream.

2. The process according to claim 1 characterized in that step (iii) additionally comprises adding said hydroxide to said waste water in said container, and step (iv) additionally comprises maintaining said waste water in said container in an agitated condition for a time of from about 1 to about 15 minutes while adding said anionic flocculant to said waste water.

3. The process according to claim 1 characterized in that step (iii) additionally comprises passing said waste water stream from said container to a second container equipped with means for agitation while adding said hydroxide to said waste water stream, and step (iv) additionally comprises maintaining said waste water in said second container in an agitated condition for a time of from about 1 to about 15 minutes while adding said anionic flocculant to said waste water.

4. The process according to claim 1 characterized in that step (iii) additionally comprises passing said waste water stream from said container to a pipe or trench while adding said hydroxide to said waste water stream, and step (iv) additionally comprises adding said anionic flocculant to said waste water stream in said pipe or trench.

5. The process according to claims 2, 3 or 4 characterized in that said waste synthetic polymeric material is selected from the group consisting of carboxylated styrene-butadiene copolymers, styrene-butadiene copolymers, acrylonitrile-butadiene copolymers, carboxylated acrylonitrile-butadiene copolymers, and mixtures thereof.

6. The process according to claims 2, 3 or 4 characterized in that said waste synthetic polymeric material is one or more carboxylated styrene-butadiene copolymers.

7. The process according to claims 2, 3 or 4 characterized in that said waste synthetic polymeric material is one or more carboxylated styrene-butadiene copolymers in admixture with one or more polymers selected from the group consisting of styrene-butadiene copolymers, acrylonitrile-butadiene copolymers and carboxylated acrylonitrile-butadiene copolymers.

8. The process accordingg to claims 2, 3 or 4 characterized in that said waste water contains from about 0.1 to about 0.5 percent by weight of said waste synthetic polymeric material.

9. The process according to claims 2, 3 or 4 characterized in that the concentration of said cationic flocculant is from about 15 to about 25 ppm.

10. The process according to claims 2, 3 or 4 characterized in that concentration of said anionic flocculant is from about 3 to about 5 ppm.

11. The process according to claims 2, 3 or 4 characterized in that the concentration of calcium chloride which is provided in step (ii) is from about 200 to about 500 ppm.

* * * * *

UNITED STATES PATENT AND TRADEMARK OFFICE
CERTIFICATE OF CORRECTION

PATENT NO. : 4,456,534

DATED : June 26, 1984

INVENTOR(S) : Jean-Pierre LAMBERT et al.

It is certified that error appears in the above-identified patent and that said Letters Patent is hereby corrected as shown below:

Column 1, line 59, "calcuim" should read --calcium--.
Column 3, line 63, "through" should read --thorough--.
Column 4, line 60, "containerr" should read --container--.
Column 8, line 44, "accordingg" should read --according--;

Signed and Sealed this

Thirtieth Day of October 1984

[SEAL]

Attest:

GERALD J. MOSSINGHOFF

Attesting Officer    Commissioner of Patents and Trademarks